Figure 1:
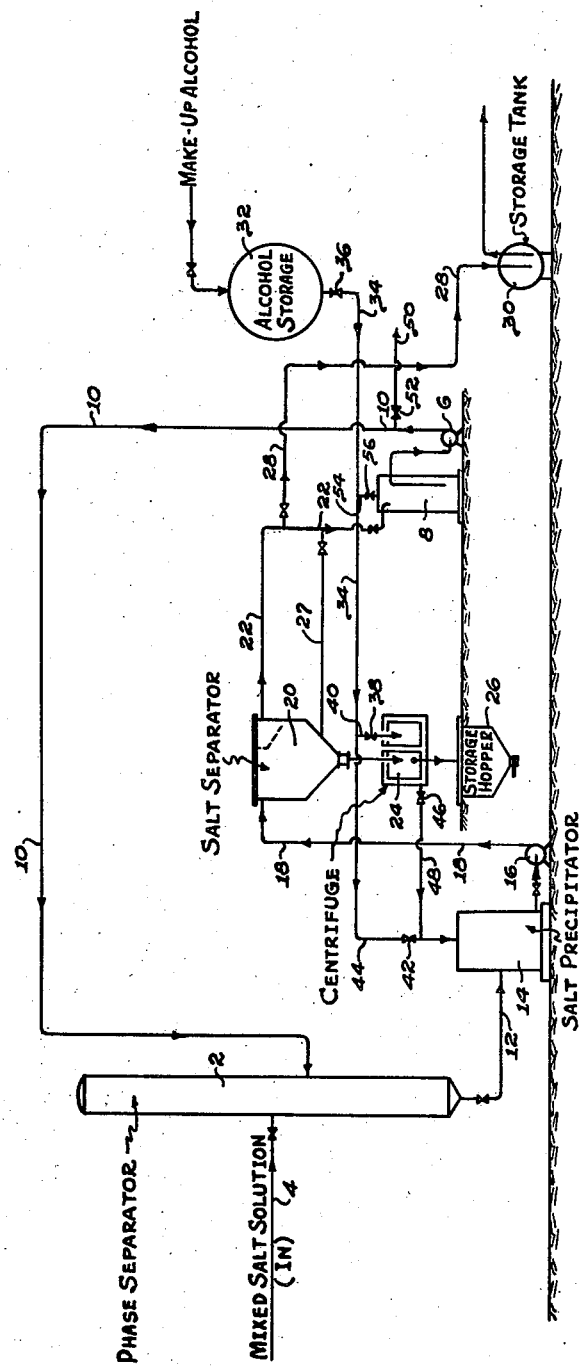

Oct. 16, 1945.  J. A. SHAW  2,386,985
PROCESS FOR THE RECOVERY OF AMONIUM THIOSULPHATE AND THIOCYANATE
Filed Oct. 11, 1944  2 Sheets-Sheet 1

INVENTOR.
JOSEPH A. SHAW.
BY Edmund F. Borden
his ATTORNEY.

Oct. 16, 1945.  J. A. SHAW  2,386,985
PROCESS FOR THE RECOVERY OF AMONIUM THIOSULPHATE AND THIOCYANATE
Filed Oct. 11, 1944  2 Sheets-Sheet 2

INVENTOR.
JOSEPH A. SHAW.
BY Edmund G. Borden
his ATTORNEY.

Patented Oct. 16, 1945

2,386,985

UNITED STATES PATENT OFFICE 2,386,985

PROCESS FOR THE RECOVERY OF AMMONIUM THIOSULPHATE AND THIOCYANATE

Joseph A. Shaw, Pittsburgh, Pa., assignor, by mesne assignments, to Koppers Company, Incorporated, Pittsburgh, Pa., a corporation of Delaware Application October 11, 1944, Serial No. 558,262

9 Claims. (Cl. 23—75)

The present invention relates in general to the separation and recovery of water-soluble thiocyanates and thiosulphates from aqueous solutions thereof and has reference more particularly to the recovery of substantially pure ammonium thiosulphate and ammonium thiocyanate from gas liquors containing the same. The invention is particularly useful in the separation of water-soluble thiocyanates and thiosulphates occurring in the divers liquors of a by-product coke plant.

It is well known that certain thiocyanates are soluble in alcohol and in water, and that thiosulphates are insoluble in alcohol. Upon this fact there have been based methods for the separation of the two said salts especially with the purpose of producing pure thiocyanates. One method, for example, comprises the evaporation to dryness of the salts, and subsequent extraction of the thiocyanate with alcohol. In this method, a major portion of the thiosulphate is decomposed by the heat employed in evaporation of the salt solution.

It is also well known that the addition of a large quantity of alcohol to a solution containing ammonium thiocyanate and thiosulphate will precipitate out the ammonium thiosulphate and thus it can be obtained without decomposition; but the process is commercially infeasible because whenever the concentration of thiocyanate in solution is at all substantial the ammonium thiosulphate so obtained is contaminated with thiocyanate which is difficult, if not impossible, to remove even by repeated alcohol washings.

The primary object of the present invention is the provision of an improved process and means for recovering substantially pure ammonium thiosulphate salt from an aqueous solution containing ammonium thiosulphate and ammonium thiocyanate.

Another object of the invention is the provision of an improved process for the separation of ammonium thiosulphates from thiocyanates whereby both salts can be more easily and economically recovered as pure products.

The invention has for further objects such other improvements and such other operative advantages or results as may be found to obtain in the processes or apparatus hereinafter described or claimed.

It has now been discovered that, by adding alcohol slowly to an aqueous solution of ammonium thiosulphate and thiocyanate, the solution can, before thiosulphate salt is precipitated therefrom, be separated into two liquid phases, a predominantly alcoholic upper phase and a predominantly aqueous lower phase. If a further quantity of alcohol is added to the solution, the said aqueous phase disappears and thiosulphate salt precipitates. The so-separated salt is, as before described, contaminated with difficultly removable thiocyanate. However, if the discovered lower aqueous phase, which contains the major portion of the thiosulphate, be removed from contact with the upper alcoholic phase and be thereafter treated with additional quantities of alcohol to precipitate ammonium thiosulphate, the so-obtained thiosulphate when washed with alcohol and dried is substantially free of thiocyanate.

Figure 2:
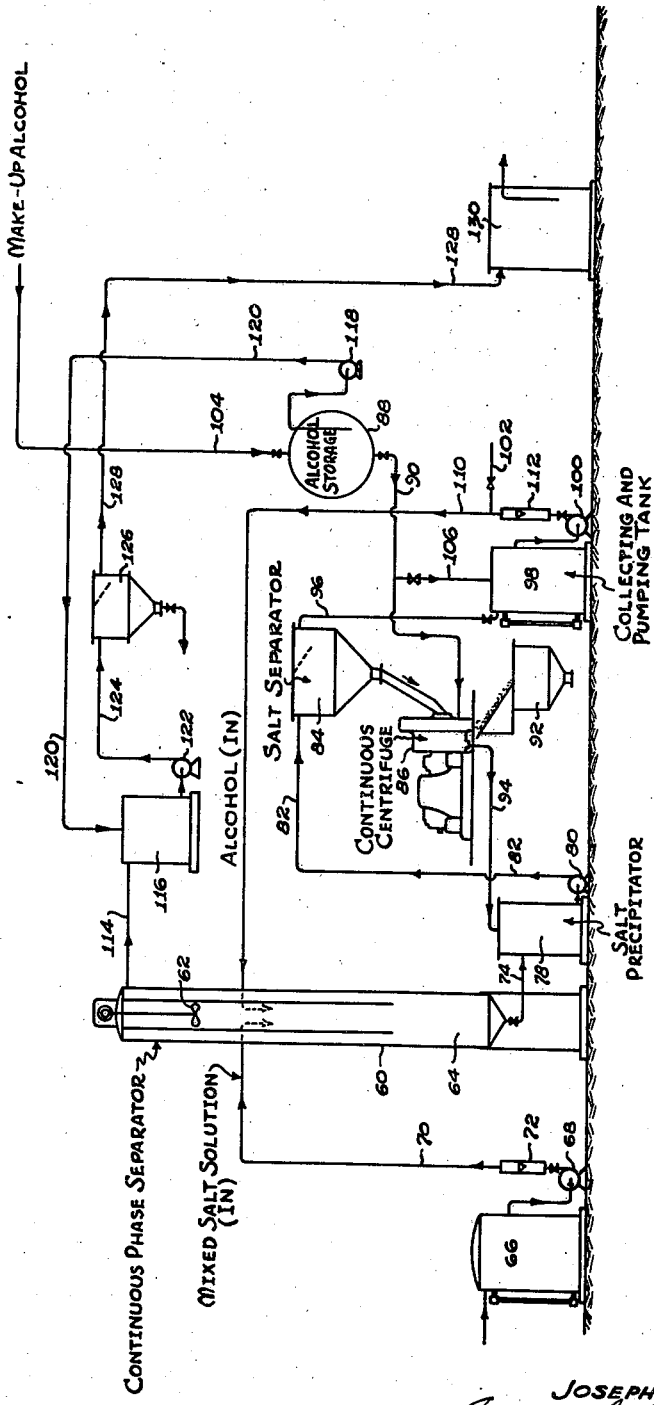

In the accompanying drawings forming a part of this specification and showing for purposes of exemplification a preferred apparatus and process in which the invention may be embodied and practiced but without limiting the claimed invention specifically to such illustrative instance or instances:

Fig. 1 is a diagrammatic elevational view of a flow sheet of apparatus for the operation of the process of the present invention as a batch process; and Fig. 2 is a similar view partly in vertical cross-section of alternate apparatus whereby the process can be conducted continuously.

Referring to the drawings and particularly to Fig. 1, a phase separator 2, that can be simply a tall tower operating as a settling tank, is approximately half-filled with a mixed aqueous salt solution containing ammonium thiocyanate and thiosulphate, which is flowed to the said separator through valved line 4. Alcohol, containing some water in solution and also some salt is thereafter pumped from a dilute alcohol storage and pumping tank 8 by pump 6 through a pipe 10 and is flowed gradually therethrough into the said phase separator 2.

The so-added alcohol forms a solution with the aqueous salt solution until there has been added a volume of alcohol approximately equal to the volume of the said aqueous salt solution, depending however upon the relative salt concentration in solution. At about this said ratio of added alcohol to original aqueous solution, a predominantly aqueous salt solution appears at the base of the separator. After sufficient alcohol has been flowed into the separator to form the two said liquid phases and before any solid phase has been formed, the addition of alcohol is stopped and the two phases are permitted to settle and to separate.

The separated, lower, predominantly aqueous phase is drained from the said phase separator 2 through pipe 12 into a tank 14 wherein the ammonium thiosulphate of the said aqueous phase is precipitated out by the addition thereto of further quantities of alcohol, this alcohol being a wash alcohol derived from another step of the process as hereinafter described. A slurry comprising the salt precipitate and solution is pumped from tank 14 by a pump 16, through a pipe 18 and into a hopper-shaped separating tank 20, and is allowed to settle therein. The liquid so separated from solids of the slurry is decanted from the said separator 20 through a pipe 22 into the pumping tank 8. The settled slurry is drained from the separating tank 20 into a centrifuge 24, wherein the precipitated salt is substantially dehydrated and is washed with alcohol for removal of substantially all traces of thiocyanates. The dried, washed precipitate constitutes substantially pure ammonium thiosulphate. After centrifugalization and washing, the thiosulphate is delivered from the said centrifuge 24 to a storage hopper 26. A valved pipe 27 connecting the salt separator 20 to pipe 22 can be employed to effect complete drainage of the said separator upon completion of treatment of the said aqueous phase.

After the predominantly aqueous phase has been substantially completely drained from the said phase separator 2, the supernatant, predominantly alcoholic phase is drained through the said valved line 12 into the tank 14 wherein this phase also is treated with another addition of alcohol either from storage or the above described washing step, and substantially all of the thiosulphate remaining in the alcoholic phase is precipitated therefrom. The slurry so produced is pumped by pump 16 to the salt separator 20 and the salt content of the slurry is settled out. This salt, which consists of impure thiosulphate, is returned to the salt solution entering the phase separator 2.

The alcoholic solution from which thiosulphate has been separated is flowed from the separator 20 through pipes 22 and 28 into the collecting tank 30. Usually substantially pure ammonium thiocyanate can be recovered from the alcoholic solution by simple evaporation and crystallization steps and the separated alcohol can either be returned directly to the process or, if necessary, be rectified in the customary manner and the product employed to replenish the alcohol in a storage tank 32. If an appreciable amount of ammonium thiosulphate remains in the dilute alcoholic solution, this contaminant can be destroyed by treatment with a mineral acid and the solution can be filtered before the said evaporation and crystallization steps are employed.

Alcohol from the storage tank 32 is drained therefrom through header 34 and valve 36 for various points in the process. Alcohol for washing thiosulphate crystals is directed into centrifuge 24 by opening a valve 38 in a pipe 40 extending from the said header 34, and, for precipitating thiosulphate can be delivered directly to the salt precipitator 14 by opening valve 42 in a pipe 44, also branching from the said header.

Wash alcohol from the centrifuge 24 is drained by opening valve 46 in a pipe 48 through which such alcohol also can be flowed to the said salt precipitator. This supply of alcohol for the salt-precipitating step is usually the only alcohol added to the salt precipitator, since enough alcohol is ordinarily employed in washing the thiosulphate crystals to precipitate a later batch of salt.

The recirculated alcohol in the described salt recovery system will in some instances become so diluted with water that its efficacy in the phase separating step will be impaired. In such an instance, the dilute alcohol can be pumped from the pumping tank 8 through a pipe 50 having a valve 52 and through which it can be delivered to customary still means for rectification and subsequent return to the alcohol storage tank 32. A pipe 54 connecting the pipe 34 directly to the said alcohol storage and pumping tank 8 and having a valve 56 can, by opening the valve, be used to conduct non-diluted alcohol directly to the phase separating step. Thus, the amount of water returned to the said phase separator 2 can be regulated within those limits making feasible the use of convenient proportions and the obtaining of optimum yields of thiosulphate in the said phase separating step.

In accordance with the present invention, the apparatus may be so constituted, and modifications in process are so provided, as to achieve a continuous process. Such provision, as shown more particularly in Fig. 2, includes a continuous phase separator 60. This separator may be one of any of several designs and will contain, for example, means 62 for agitating and securing intimate mixing of incoming mixed-salt solution and alcohol, and a settling chamber 64 for securing the separation of the two liquid phases formed by the incoming liquids.

Aqueous solution of thiocyanate and thiosulphate salt is pumped continuously into the inner, mixing cylinder of the separator 60 at a measured and controlled rate from a storage tank 66 therefor, by a pump 68 and through pipe 70, having a rotameter 72 disposed therein. Within the phase separator 60 aqueous solution and alcohol added in predetermined proportion to the said solution in a manner as hereinafter described, mix thoroughly, form two phases, and thereafter separate, in the settling chamber 64, into a supernantant predominantly alcoholic solution and a lower predominantly aqueous solution containing substantially all the thiosulphate salt.

The lower aqueous phase is continuously drained from the base of the said phase separator 60 and is flowed through pipe 74 to a salt precipitator 78 wherein an additional stream of alcohol is added to the inflowing aqueous phase. A slurry is formed by such alcohol addition and is pumped from the salt precipitator 78 by a pump 80 through pipe 82 to a salt separator 84 similar to the salt separator 20 previously described.

Settled slurry from the said salt separator 84 is flowed into a continuous centrifuge 86 such, for example, as the type invented by Dr. Gustav ter Meer and manufactured by the Baker Perkins Company. Therein the thiosulphate of the aqueous slurry is substantially dehydrated, is washed by alcohol flowing from an alcohol storage tank 88 through pipe 90, and is discharged to a product storage hopper 92, all by completely automatic, continuous operation. Wash alcohol flows from the said centrifuge through pipe 94 to the said salt precipitator 78 wherein it is used to precipitate the thiosulphate salt and wherein it becomes a part of the slurry of precipitated salt and alcohol-water solution.

Continuous overflow of dilute alcohol from the salt separator 84 flows through a pipe 96 to a pumping tank 98, whence it can be pumped by a pump 100 through a valved pipe 102 to distillation means for rectification of the alcohol therein whereby the alcohol in the storage tank 88 can be replenished by return of the so-rectified alcohol thereto through pipe 104.

Alcohol can be delivered to the said pumping tank 98 directly from the storage tank 88 through a pipe 106, so that predetermined proportions of redistilled alcohol and dilute alcohol which has been employed to precipitate and to wash thiosulphate salt, can be continuously mixed. The mixture of redistilled and dilute alcohol is pumped from the said pumping tank 98 by pump 100 and through a pipe 110 having disposed therein rotameter 112 to the continuous phase separator 60. By controlling the proportion of dilute and redistilled alcohol in the aforesaid step, the mixture can be maintained at a concentration making continuously separable two liquid phases upon its admixture at controlled rate with aqueous salt solution.

The supernatant predominantly alcoholic phase is continuously decanted from the top of the phase separator 60 and is flowed through a pipe 114 to a salt precipitator 116. Alcohol which is pumped from the alcohol storage tank 88 by a pump 118 through a pipe 120 is continuously added to the inflowing alcoholic phase in the precipitator 116. A slurry of thiosulphate precipitate is formed by such alcohol addition and is pumped from the salt precipitator 116 by a pump 122 through a pipe 124 to a salt separator 126 similar to the salt separator 84 previously described. The impure thiosulphate salt which is obtained from the said salt separator 126 is returned to the said storage tank 66 for reprocessing.

Continuous overflow of alcohol solution from the salt separator 126 flows through a pipe 128 to the thiocyanate-solution storage tank 130 whence it can be flowed to distillation means for rectification of the alcohol therein and to evaporation and crystallization means for recovery of the ammonium thiocyanate contained therein.

Example No. 1

In one example of operation according to the process of the present invention, an aqueous solution of ammonium thiocyanate and ammonium thiosulphate was treated and the salts were separated therefrom. The said aqueous solution was prepared by evaporating spent ammonia Thylox solution, a gas washing solution containing an ammonia sulphur-arsenic compound, thereby driving off ammonia and precipitating arsenic compounds which were thereafter filtered from the said solution. Analysis of the so-evaporated solution was the following:

Specific gravity _____ 1.256 at 25°/25°
Ammonium thiosulphate ____ 373 grams per liter
Ammonium thiocyanate _____ 454 grams per liter
Boiling point (atm.) _____ 117° C.

An equal volume of 95% alcohol was added to the above solution, whereupon there was formed two liquid phases, an upper, predominantly alcoholic phase and a lower, predominantly aqueous phase, in the ratio by volume, of respectively 3.71 to 1. The phases analyzed as follows:

| | Upper phase | Lower phase |
|---|---|---|
| Specific gravity | 0.9806 | 1.315 |
| Ammonium thiosulphate__grams/liter__ | 52.4 | 650 |
| Ammonium thiocyanate_____do____ | 234 | 188 |
| $C_2H_5OH$_____do____ | 448 | 57.5 |

Approximately 67% of the ammonium thiosulphate was absorbed in the lower layer which was withdrawn from contact with the said upper phase and was thereafter treated with approximately twice its volume of alcohol. A slurry was formed by the said addition of alcohol, the solid phase consisting of substantially all the ammonium thiosulphate of the said lower phase, and a liquid phase consisting of an alcohol-water solution containing slight quantities of ammonium thiocyanate and thiosulphate. The so-formed slurry was centrifuged and the dried salt was washed with alcohol, whereby a white, high quality ammonium thiosulphate was obtained.

Example No. 2

In a second example of batch operation, 77% of the ammonium thiosulphate of the treated concentrated solution was contained in the lower liquid phase which had a volume of less than one-quarter of the total liquid volume in the phase separator. In this case the original solution had a ratio of ammonium thiosulphate to ammonium thiocyanate of 0.820 and a total concentration of 827 grams per liter.

Variation in the ratio of the two salts in solution to be treated effects the degree of concentration to which the solution can be originally evaporated before there is danger of precipitating thiosulphate crystals during the first phase separation step. Since the evaporated Thylox solutions exhibit varying ratios of thiosulphate to thiocyanate, it is therefore important to efficacious operation of the process that means be employed to avoid such deleterious salt precipitation. It has now been found that, even though the ratio of thiosulphate to thiocyanate varies as much as from 0.8 to 1.5, if the specific gravity of the mixed salt solution is maintained below about 1.25, the formation of a solid phase during the first separation can be avoided. This finding was made on the basis of runs made at 25° C. and when employing equal volumes of 95% alcohol and solution. It was further found that increasing the temperature of the liquids, and especially that returning some water in solution in the alcohol in the continuous method, would aid in avoiding formation of solid phase. Additional provisions, as have been heretofore described and which include means for controlling the rate of flow of mixed salt solution and of alcohol to the phase separator, and the concentration of water in the alcohol to be flowed to the phase separator, may be made for the continuous operation of the present process and avoid the formation of solid phase in the first step, and the consequent contamination of thiosulphate salt.

Example No. 3

A solution containing 302 grams per liter ammonium thiosulphate and 358 grams per liter ammonium thiocyanate was heated with one and one-half volumes of alcohol at 30° C. A lower concentrated aqueous layer of ammonium thiosulphate was formed, and separated from a supernatant alcoholic layer. To the separated aqueous phase approximately three times its volume of alcohol was added and salt was precipitated which after washing and drying was substantially pure ammonium thiosulphate. The said upper phase was treated with an equal volume of alcohol. Impure ammonium thiosulphate was precipitated by the addition step, was filtered out, and returned to the original solution for reprocessing. Approximately 82% of the contaminating thiosulphate of the said upper phase was removed by this second alcohol addition. The filtrate comprised a solution of ammonium thiocyanate contaminated with about 4.5% by weight of ammonium thiosulphate. The said filtrate was distilled at reduced pressure leaving a distillation residue comprising, at room temperature, an aqueous slurry of ammonium thiocyanate crystals. Such crystals, directly recovered, and without further purification, as by washing, were white, without mercaptan odor, and contained about 1.4% ammonium thiosulphate.

The alcohol referred to in the following claims is generally to be ethyl alcohol because of its obviously greater practicality.

The invention as hereinabove set forth is embodied in particular form and manner but may be variously embodied within the scope of the claims hereinafter made.

I claim:

1. A process for the separation and recovery of ammonium thiosulphate and ammonium thiocyanate from aqueous solution-mixture of the same, comprising: adding alcohol to the aqueous solution until separate predominantly aqueous and predominantly alcoholic liquid phases are formed; separating the liquid phases; adding alcohol to each separated phase to precipitate ammonium thiosulphate; washing the precipitate from the aqueous phase to provide substantially pure ammonium thiosulphate; distilling alcohol from the alcoholic phase; and crystallizing ammonium thiocyanate from the so-formed distillation residue.

2. A process for the separation and recovery in substantially pure form of ammonium thiosulphate and ammonium thiocyanate from a solution-mixture thereof, the said process comprising the steps of: separating the solution, by controlled addition of alcohol thereto, into two liquid phases only, in one of which the thiocyanate-thiosulphate ratio, and in the other the thiosulphate-thiocyanate ratio, is greatly increased over that ratio, respectively, existing in the original salt solution; separating the two liquid phases and treating each of the separated phases with alcohol to precipitate ammonium thiosulphate therefrom; thereafter washing the precipitate from the predominantly thiosulphate phase with alcohol thus providing substantially pure ammonium thiosulphate and returning precipitate from the other phase to the first said step; and evaporating, and crystallizing ammonium thiocyanate from the filtrate of the said other phase.

3. A process for the separation and recovery in substantially pure form, of ammonium thiocyanate and ammonium thiosulphate from solution-mixtures thereof, comprising the steps of: separating the solution by controlled addition of alcohol thereto, into two liquid phases only, in one of which the thiocyanate-thiosulphate ratio, and in the other the thiosulphate-thiocyanate ratio, is greatly increased over that ratio, respectively, existing in the original salt solution; separating the two liquid phases and treating such of the separated phases with alcohol to precipitate thiosulphate therefrom; thereafter washing the precipitate from the predominantly thiosulphate phase with alcohol thus providing substantially pure ammonium thiosulphate and returning the precipitate from the said other phase to the first said step; evaporating alcohol from the filtrates of the said phases; and crystallizing from the concentrated filtrates ammonium thiocyanate.

4. A process for the separation and recovery, in substantially pure form, of ammonium thiocyanate and ammonium thiosulphate of aqueous gas liquors comprising the steps of: evaporating such gas liquor to obtain a concentrated solution of the said salts; flowing alcohol into the said solution until a separate, liquid phase settles out thereby forming a two-phase system of two liquids only, a supernatant predominantly alcoholic layer containing a major portion of the thiocyanate and a lower predominantly aqueous layer containing a major portion of the thiosulphate; separating the two liquid phases and treating each phase out of contact with the other with a further quantity of alcohol to precipitate the thiosulphate content of each said phase; washing the so-precipitated salt from the predominantly aqueous phase with additional quantity of alcohol to provide substantially pure ammonium thiosulphate; flowing the alcohol of the said washing steps into further quantities of concentrated solution; returning precipitated salt from the predominantly alcoholic phase to the first said step; distilling the said alcoholic phase for recovery of its alcohol content, thereby providing a distillate of alcohol which can be returned in the cycle of the process and an aqueous distillation residue which contains ammonium thiocyanate; filtering and evaporating the said residue; and crystallizing from the concentrated filtrate substantially pure ammonium thiocyanate.

5. A process for the continuous separation and recovery of ammonium thiocyanate and ammonium thiosulphate from an aqueous solution-mixture of the salts, comprising: flowing at a measured rate such aqueous solution and alcohol into admixture in such relative proportion that a supernatant predominantly alcoholic phase and a lower, predominantly aqueous phase only are formed by said mixing; continuously separating, by decantation the two said phases; continuously flowing alcohol into admixture with each of the separated phases to precipitate from each ammonium thiosulphate; continuously separating the precipitate from the said aqueous phase, washing with alcohol and drying to provide substantially pure ammonium thiosulphate; returning precipitate from the said alcoholic phase to the untreated solution-mixture of salts; evaporating alcohol from the filtrate of the predominantly alcoholic phase; and crystallizing ammonium thiocyanate from the so-formed evaporation residue.

6. A process for the continuous separation of ammonium thiosulphate and ammonium thiocyanate in aqueous solution-mixture thereof, and for the continuous recovery of substantially pure ammonium thiosulphate and the production of substantially pure ammonium thiocyanate, the said process comprising the steps of: continuously flowing alcohol into the said aqueous solution until a separate, liquid phase settles out thereby forming a two phase system of two liquids only, in the upper one of which the thiocyanate-thiosulphate ratio, and in the lower the thiosulphate-thiocyanate ratio is greatly increased over that ratio respectively existing in the original salt solution; continuously separating, by decantation, the two phases; continuously flowing alcohol into admixture with each of the separated phases to precipitate ammonium thiosulphate from each phase; continuously separating the precipitate from the said aqueous phase, washing with alcohol and drying to provide substantially pure ammonium thiosulphate; continuously flowing the alcohol of the said washing step into further quantities of aqueous solution; continuously returning, in aqueous solution, precipitate from the said alcoholic phase to untreated solution-mixture; distilling the filtrate of the alcoholic phase for recovery of its alcohol content, to provide a distillate of alcohol which is continuously returned to the first stage of the cyclic process and an aqueous distillation residue which contains ammonium thiocyanate; filtering and evaporating the residue; and crystallizing from the concentrated filtrate substantially pure ammonium thiocyanate.

7. In a process for the separation and recovery of ammonium thiocyanate and ammonium thiosulphate from aqueous solution-mixture thereof, the steps comprising: gradually adding alcohol to such aqueous solution to form two liquid phases only, one predominantly aqueous and the other alcoholic; separating the phases; and adding alcohol to each of the separated phases to precipitate ammonium thiosulphate and washing the precipitate obtained from the aqueous phase to recover substantially pure ammonium thiosulphate.

8. In a process for the separation and recovery of ammonium thiosulphate and ammonium thiocyanate from an aqueous solution-mixture thereof the steps comprising: continuously flowing at a predetermined rate such aqueous solution and alcohol into admixture in such proportion that a supernatant, predominantly alcoholic phase and a lower predominantly aqueous phase only are formed by said mixing; continuously separating by decantation the said phases; continuously flowing alcohol into each of the separated phases to precipitate from each ammonium thiosulphate; and washing the precipitate obtained from the aqueous phase to recover substantially pure ammonium thiosulphate.

9. In a process for the separation and recovery of substantially pure ammonium thiosulphate and ammonium thiocyanate from aqueous solution-mixture containing a relatively high concentration of the ammonium thiocyanate salt, the steps comprising: evaporating the aqueous solution to a specific gravity of at most less than about 1.25; flowing at a predetermined rate such aqueous solution and alcohol into admixture in such proportion that a supernatant, predominantly alcoholic phase, and a lower predominantly aqueous phase only are formed by said mixing; separating by decantation the said phases; flowing alcohol into each of the separated phases to precipitate from each ammonium thiosulphate; and washing the precipitate obtained from the aqueous phase to recover substantially pure ammonium thiosulphate.

JOSEPH A. SHAW.